United States Patent
Cain

(10) Patent No.: US 6,824,383 B2
(45) Date of Patent: Nov. 30, 2004

(54) DIFFUSE COMBUSTION METHOD AND APPARATUS

(75) Inventor: Bruce E. Cain, Akron, OH (US)

(73) Assignee: North American Manufacturing Company, Cleveland, OH (US)

( * ) Notice: Subject to any disclaimer, the term of this patent is extended or adjusted under 35 U.S.C. 154(b) by 0 days.

(21) Appl. No.: 10/637,275

(22) Filed: Aug. 8, 2003

(65) Prior Publication Data

US 2004/0063054 A1 Apr. 1, 2004

Related U.S. Application Data

(60) Provisional application No. 60/401,954, filed on Aug. 8, 2002.

(51) Int. Cl.$^7$ ................................................ F23N 5/00
(52) U.S. Cl. ......................... 431/12; 431/33; 110/190
(58) Field of Search ........................... 431/12, 33, 75; 110/190, 341

(56) References Cited

U.S. PATENT DOCUMENTS

| | | | |
|---|---|---|---|
| 4,140,067 A | 2/1979 | Jensen | |
| 4,583,936 A | 4/1986 | Krieger | |
| 4,945,841 A | 8/1990 | Nakamachi et al. | |
| 5,165,884 A | 11/1992 | Martin et al. | |
| 5,379,683 A | * 1/1995 | Ejiri et al. | 99/331 |
| 5,484,279 A | 1/1996 | Vonasek | |
| 5,533,890 A | 7/1996 | Holst et al. | |
| 5,635,139 A | 6/1997 | Holst et al. | |
| 5,967,113 A | * 10/1999 | Kaneko et al. | 123/295 |
| 5,989,010 A | 11/1999 | Martin et al. | |
| 6,126,913 A | 10/2000 | Martin et al. | |
| 6,330,825 B1 | * 12/2001 | Harness et al. | 73/118.1 |

OTHER PUBLICATIONS

Tempest 4441 Burner, Dimensions and Parts List 4441-1, North American Manufacturing Company, Ltd., Cleveland, OH, Apr. 2003, pp. 1–2.

Tempest 4441 Burner, Bulletin 4441, North American Manufacturing Company, Ltd., Cleveland, OH, Apr. 2003, pp. 1–2.

* cited by examiner

Primary Examiner—Alfred Basichas
(74) Attorney, Agent, or Firm—Jones Day

(57) ABSTRACT

A method includes the step of extinguishing a flame fired from a burner in a reaction zone upon determining that a sensed combustion chamber temperature is at or above the auto-ignition temperature of a fuel. A subsequent step is performed before the sensed combustion chamber temperature drops below the auto-ignition temperature. The subsequent step provides a flow of the fuel through the burner and into the combustion chamber through a reaction zone outlet. This initiates diffuse combustion of the fuel by auto-ignition in the combustion chamber in the absence of a flame fired from the burner in the reaction zone.

32 Claims, 5 Drawing Sheets

DIFFUSE COMBUSTION METHOD AND APPARATUS

RELATED APPLICATIONS

This application claims priority of provisional U.S. Patent Application No. 60/401,954, filed Aug. 8, 2002, which is incorporated by reference.

FIELD OF THE INVENTION

This invention relates to a furnace combustion system.

BACKGROUND OF THE INVENTION

A furnace may provide heat by burning fuel gas in a combustible mixture with oxidant gas. Such a furnace includes one or more burners, and has a reactant supply system with lines and valves that direct streams of the fuel and oxidant gases to the burners. In some furnaces the fuel and oxidant gases are provided to the burners in separate streams that form combustible mixtures within the burners. In other furnaces the fuel and oxidant gases are provided to the burners in a combustible mixture known as premix. In each case, the furnace has a control system that controls the reactant supply system so that combustion of the fuel will occur in a manner appropriate for the heating process to be performed by the furnace. The control system includes instruments such as temperature sensors, igniters, and flame detectors, and controls the valves in the reactant supply system with reference to combustion parameters indicated by those instruments.

Parts of a known furnace apparatus 10 are shown schematically in FIGS. 1 and 2. These include a burner assembly 12 mounted in a furnace wall structure 14. The wall structure 14 defines a combustion chamber 15, which may be referred to as a process chamber, with a flue gas outlet 16. A reactant supply system 20 provides reactants to the burner assembly 12 under the direction of a control system 22. This enables the burner assembly 12 to provide a controlled amount of heat for a heating process to be carried out in the combustion chamber 15.

The reactant supply system 20 includes fuel and oxidant supply lines 24 and 26 that convey fuel and oxidant from respective sources 28 and 30 to the burner assembly 12. The oxidant is typically the oxygen in a stream of air, and the fuel is typically natural gas. A motorized oxidant valve 32 controls the stream of air in the oxidant supply line 26. A pair of motorized fuel valves 34 and 36 control the stream of fuel in the fuel supply line 24. The oxidant valve 32 and the first fuel valve 34 are modulating valves. The second fuel valve 36 is a shut-off valve. Each valve motor is operated by the control system 22 to open, shift, and close the respective valve 32, 34 or 36 as directed by the control system 22.

The burner assembly 10 has two major portions 40 and 42 that are shown schematically in FIG. 1. The first portion 40 is a burner tile with an internal reaction zone 43. A generally cylindrical inner surface 44 of the burner tile 40 is centered on an axis 45, and defines the peripheral boundaries of the reaction zone 43. An outer end surface 46 of the burner tile 40 defines an outlet 47 that communicates the reaction zone 43 with the combustion chamber 15. The outlet 47 is circular and also is centered on the axis 45. An end portion 48 of the inner surface 44 is tapered radially inward so that the outlet 47 is constricted relative to the generally cylindrical configuration of the reaction zone 43.

The second major portion 42 of the burner assembly 10 comprises a burner with a fuel inlet 50 and an oxidant inlet 52. Passages within the burner 42 receive the streams of fuel and oxidant from the inlets 50 and 52 to form a combustible mixture, and the burner 42 is oriented to fire a flame into the reaction zone 43 in a direction extending into the combustion chamber 15 through the outlet 47.

The control system 22 includes a controller 60. The control system 22 further includes a temperature sensor 62 which is operative in the combustion chamber 15. Additional parts of the control system 22 that are shown schematically in FIG. 1 include an igniter 64 and a flame detector 66. These are conventional devices that are operatively mounted in the burner assembly 10 in a known manner.

Other parts of the burner assembly 12, the furnace wall structure 14, the reactant supply system 20 and the control system 22 are known to a person of ordinary skill in the art. Those parts, such as a flame stabilizer within the burner assembly 12, are omitted from the drawings for clarity of the schematic illustrations.

As indicated in FIG. 1, the controller 60 includes flame supervisory controls in the form of hardware and/or software 70 for operation of the furnace apparatus 10 with flame supervision, and further has a flame supervision bypass function, including hardware and/or software 72 for bypassing flame supervision. As the controller 60 carries out those instructions, it first actuates the valves 32, 34 and 36 to provide streams of fuel and oxidant along the supply lines 24 and 26, and actuates the igniter 64 to initiate combustion of those reactants in a flame that projects from the burner 42.

As the streams of fuel and oxidant continue to flow to the burner 42, the controller 60 provides flame supervision in accordance with the corresponding flame supervisory controls 70. Flame supervision is one of several supervisory functions the controller 60 performs by monitoring sensors that can indicate system malfunctions. If a malfunction occurs, the controller 60 can respond by closing the shut-off valve 36 as a safety precaution. However, if a malfunction does not present an unsafe condition, the controller 60 can bypass the supervisory function for the corresponding sensor, and can allow combustion to continue. The controller 60 thus monitors the flame detector 66 in readiness to close the shut-off valve 36 if the flame detector 66 indicates the absence of a flame. This would occur if the flame were inadvertently extinguished by a system malfunction. However, the controller 60 monitors the temperature sensor 62 also, and is operative to compare the sensed combustion chamber temperature to a predetermined auto-ignition temperature of the fuel supplied to the burner 42. If the sensed combustion chamber temperature is not less than the auto-ignition temperature, and if the flame supervision bypass function 72 is enabled, the flame supervisory controls 70 are bypassed. With the flame supervisory controls 70 bypassed, indication by the flame detector 66 of the absence of a flame projecting from the burner 42 will not result in the controller 60 closing the shut-off valve 36. Rather, the controller 60 then holds the shut-off valve 36 open so that the fuel can continue to flow through the burner 42 and onward through the reaction zone 43 to enter the combustion chamber 15 through the outlet 47. This results in diffuse combustion of the fuel upon auto-ignition in the combustion chamber 15 in the absence of a flame at the burner 42, as shown in FIG. 2.

SUMMARY OF THE INVENTION

The invention provides a method and apparatus for inducing a diffuse combustion mode of operation in a furnace, whereas the diffuse combustion described above is an unpredictable default condition that occurs when the flame is inadvertently extinguished.

The method includes the step of extinguishing a flame fired from a burner in a reaction zone upon determining that a sensed combustion chamber temperature is not below a predetermined auto-ignition temperature of a fuel. A subsequent step is performed before the sensed combustion chamber temperature drops below the auto-ignition temperature. The subsequent step provides a flow of the fuel through the burner and into the combustion chamber through a reaction zone outlet. This initiates diffuse combustion of the fuel by auto-ignition in the combustion chamber in the absence of a flame fired from the burner in the reaction zone.

The flame is can be extinguished in any one or more of a number of different ways including, for example, interrupting a flow of fuel to the burner, applying a gas pulse, or providing reactants to the burner in a fuel/oxidant ratio that does not sustain the flame. A delay may be imposed to ensure that the flame is fully extinguished before the flow of fuel is provided through the burner for auto-ignition in the combustion chamber. The combustion chamber temperature can be monitored with reference to the auto-ignition temperature of the fuel during the delay to ensure that the flow of fuel is provided before the combustion chamber temperature drops below the auto-ignition temperature. The absence of the flame can be confirmed by the use of a flame detector, either with or without imposing this delay.

The invention further provides a method of modifying a prior art furnace apparatus by rendering the prior art control system operative to perform as summarized above. It follows that the invention further includes the modified apparatus as well as a newly constructed apparatus.

DESCRIPTION OF THE INVENTION

Figure 1:
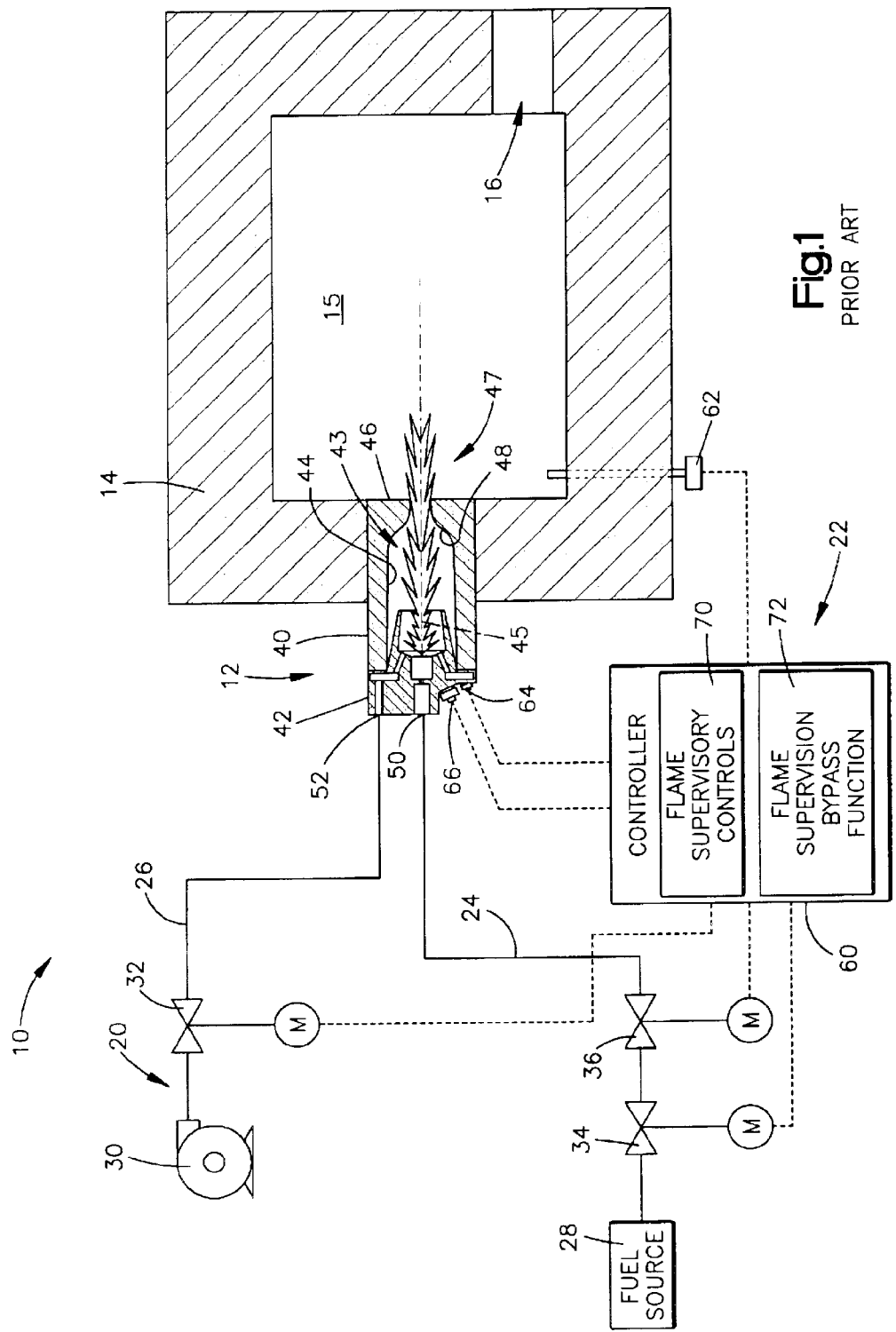
FIG. 1 is a schematic view of a furnace apparatus that is known in the prior art.
Figure 2:
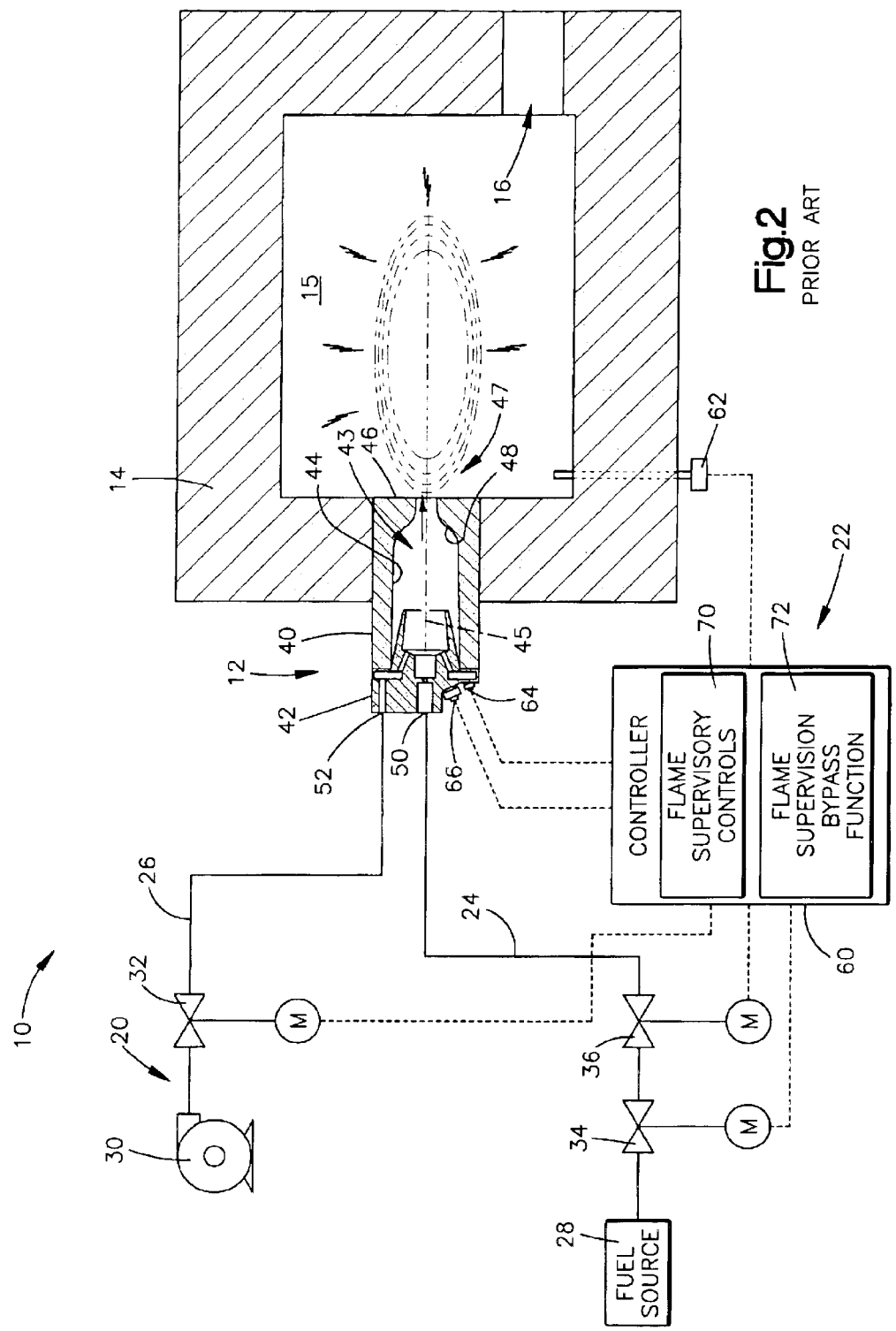
FIG. 2 is a schematic view showing the apparatus of FIG. 1 in a diffuse combustion mode of operation.
Figure 3:
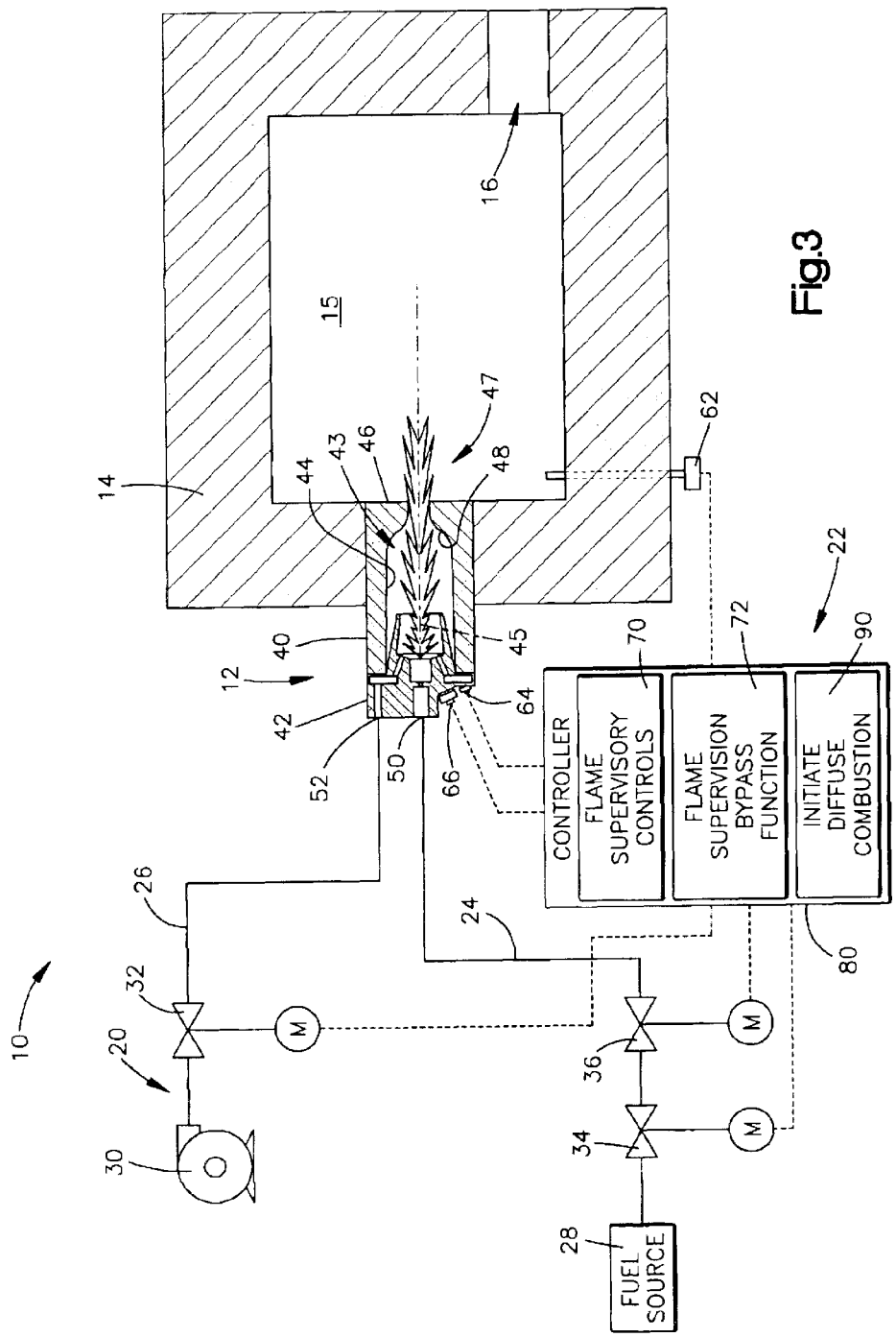
FIG. 3 is a schematic view of a furnace apparatus in accordance with the invention.

In accordance with the invention, the furnace apparatus 10 is modified by providing a controller 80 with additional control functions 90 (FIGS. 3 & 4) for initiating diffuse combustion in a controlled manner. The controller 80 of FIGS. 3 and 4 can be a modification of the prior art controller 60 described above, or a replacement for the prior art controller 60.

Figure 4:
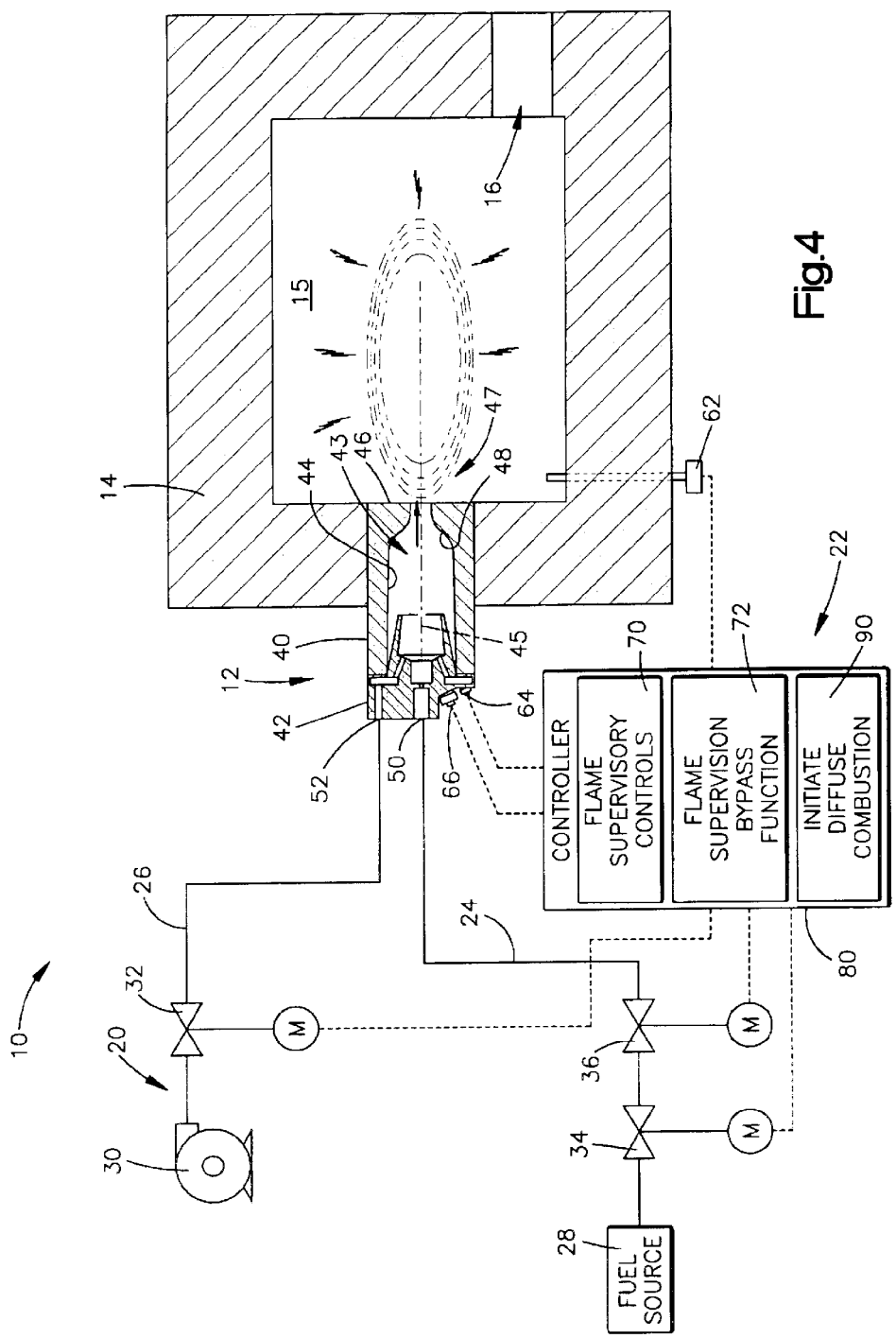
FIG. 4 is a schematic view showing the apparatus of FIG. 3 in a diffuse combustion mode of operation.

This controller 80 also commences combustion of the reactants with a flame at the burner 42, as shown in FIG. 4. However, unlike the prior art controller 60, the controller 80 can initiate the diffuse mode of combustion. The additional control functions 90 can direct the controller 80 to initiate diffuse combustion either automatically without intervention by an operator of the modified apparatus 10, or only if the operator provides corresponding actuating input. The additional control functions 90 could direct the controller 80 to receive the actuating input either before, during, or after the flame is initiated.

If diffuse combustion is to be initiated, the controller 80 compares the sensed combustion chamber temperature with the predetermined auto-ignition temperature of the fuel to determine whether or not the sensed temperature is below the auto-ignition temperature. This is preferably accomplished by comparing the combustion chamber temperature to a specified bypass setpoint temperature that is predetermined to be above the auto-ignition temperature of the fuel. If the combustion chamber temperature is less than the specified temperature, and if the flame detector 66 then indicates the absence of a flame at the burner 42, the controller 80 closes the shut-off valve 36. On the other hand, if the flame detector 66 indicates the continued presence of the flame, the controller 80 continues to monitor the sensed combustion chamber temperature with reference to the specified temperature. When the sensed combustion chamber temperature increases from a level below the specified temperature to a level at or above the specified temperature, the controller 80 responds by enabling the flame supervisor bypass function 72 so that absence of a flame at the burner 42 will not result in closing of the shut-off valve 36. The controller 80 then begins to exude the diffuse combustion function 90, closing the shut-off valve 36. This extinguishes the flame at the burner 42.

The controller 80 continues to monitor the sensed combustion chamber temperature during a short delay, such as about five seconds, after closing the shut-off valve 36. This ensures that the flame has been fully extinguished, which can be confirmed by the flame detector 66. If the sensed combustion chamber temperature drops below the specified temperature during the delay, the shut-off valve 36 will remain closed until the process is restarted. However, if the sensed combustion chamber temperature remains at or above the specified temperature, as it was when the valve 36 was closed, the controller 80 will reopen the valve 36. The fuel stream will then flow once again through the burner 42 and onward through the reaction zone 43 to enter the combustion chamber 15 through the outlet 47. Although the igniter 64 is ordinarily actuated if the valve 36 is opened from a closed condition, it is not actuated in response to reopening of the valve 36 in this manner. Auto-ignition of the fuel then occurs in the combustion chamber 15 to provide diffuse combustion in the absence of a flame at the burner 42, as shown in FIG. 4. The controller 80 continues to monitor the sensed combustion chamber temperature during furnace operation in the diffuse combustion mode, and will close the shut-off valve 36 if the temperature falls below the specified temperature.

Figure 5:
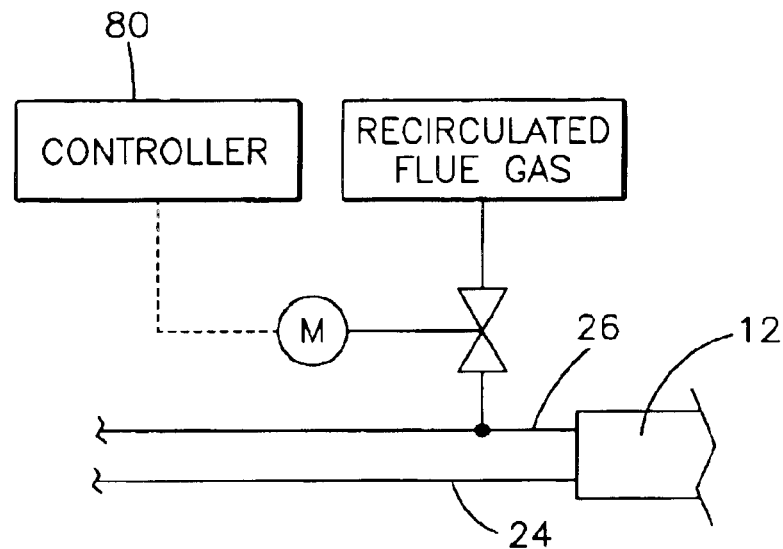
FIG. 5 is a partial view of a modification of the apparatus shown in FIGS. 3 and 4.
Figure 6:
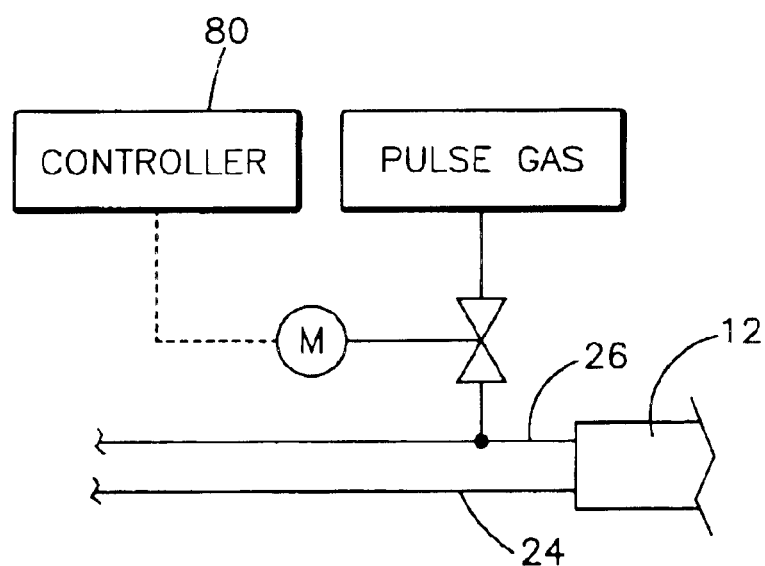
FIG. 6 also is a partial view of a modification of the apparatus shown in FIGS. 3 and 4.

As described above, the flame is extinguished by closing the shut-off valve 36. Instead, the flame could be extinguished by operating the modulating valves 32 and 34, and/or the blower 30, so as to cause the reactant supply system 20 to provide the reactants to the burner assembly 12 in a fuel/oxidant ratio that does not provide a combustible mixture to sustain the flame at the burner 42. This could be accomplished by interrupting, decreasing or increasing the flow of oxidant to the burner 42 while maintaining the flow of fuel. Recirculated flue gas (FIG. 5) also could be introduced in the burner assembly 12 to extinguish the flame by diluting the fuel/oxidant ratio in a similar manner. The reactant supply system 20 can further be provided with a source of compressed air (FIG. 6), or an inert gas such as nitrogen, for creating a pulse which would extinguish the flame. Once the flame has been extinguished, the relatively lesser flow area provided by the restricted configuration of the reaction zone outlet 47 imparts correspondingly greater velocities to the reactants flowing through the reaction zone 43 and into the combustion chamber 15, and thus helps to ensure that the flame will not reignite.

This written description sets forth the best mode of carrying out the invention, and describes the invention so as to enable a person skilled in the art to make and use the invention, by presenting examples of the elements recited in the claims. The patentable scope of the invention is defined by the claims, and may include other examples that occur to those skilled in the art. In this regard the description of a controller is meant to include any suitable control device or combination of control devices that can be programmed or otherwise arranged for a control system to perform as recited in the claims. Such other examples, which may be available either before or after the application filing date, are intended to be within the scope of the claims if they have structural or process elements that do not differ from the literal language of the claims, or if they have equivalent structural or process elements with insubstantial difference from the literal language of the claims.

What is claimed is:

1. A method of operating an apparatus comprising a furnace structure defining a combustion chamber, a reaction zone having an outlet communicating with the combustion chamber, a burner oriented to fire a flame into the reaction zone in a direction extending into the combustion chamber through the reaction zone outlet, and a temperature sensor in the combustion chamber, said method comprising:
   a) extinguishing a flame fired from the burner in the reaction zone upon determining that a sensed combustion chamber temperature is not below a predetermined auto-ignition temperature of a fuel; and
   b) subsequently, but before the sensed combustion chamber temperature drops below the auto-ignition temperature, providing a flow of the fuel through the burner and into the combustion chamber through the reaction zone outlet to initiate diffuse combustion of the fuel by auto-ignition in the combustion chamber in the absence of a flame fired from the burner in the reaction zone.

2. A method as defined in claim 1 wherein a delay is imposed to ensure that the flame is fully extinguished before the flow of fuel is provided through the burner for auto-ignition in the combustion chamber, and the combustion chamber temperature is monitored with reference to the auto-ignition temperature during the delay to ensure that the flow of fuel is provided through the burner before the combustion chamber temperature drops below the auto-ignition temperature.

3. A method as defined in claim 1 wherein the flame is extinguished upon determining that the sensed combustion chamber temperature is not below a specified temperature that is predetermined to be above the auto-ignition temperature.

4. A method as defined in claim 1 wherein the flame is extinguished as recited in claim 1 by interrupting a flow of fuel to the burner.

5. A method as defined in claim 1 wherein the flame is extinguished as recited in claim 1 by applying a gas pulse.

6. A method as defined in claim 1 wherein the flame is extinguished as recited in claim 1 by providing reactants to the burner in a fuel/oxidant ratio that does not sustain the flame.

7. A method as defined in claim 6 wherein the reactants include recirculated flue gas.

8. A method of modifying an apparatus comprising a furnace structure defining a combustion chamber, a reaction zone having an outlet communicating with the combustion chamber, a burner oriented to fire a flame into the reaction zone in a direction extending into the combustion chamber through the reaction zone outlet, a control system, and a reactant supply system operative in response to the control system to provide flows of fuel and oxidant to the reaction zone through the burner for a flame to be fired from the burner, said method comprising:
   rendering the control system operative to direct the reactant supply system to extinguish a flame fired from the burner in the reaction zone upon determining that a sensed combustion chamber temperature is not below a predetermined auto-ignition temperature of a fuel and subsequently, but before the combustion chamber temperature drops below the auto-ignition temperature, to provide a flow of the fuel through the burner and into the combustion chamber through the reaction zone outlet to initiate diffuse combustion of the fuel by auto-ignition in the combustion chamber in the absence of a flame fired from the burner in the reaction zone.

9. A method as defined in claim 8 wherein the control system is rendered operative to direct the reactant supply system as recited in claim 8 automatically without input from an operator of the apparatus.

10. A method as defined in claim 8 wherein the control system is rendered operative to direct the reactant supply system as recited in claim 8 only if an operator of the apparatus provides corresponding input instructions.

11. A method as defined in claim 8 wherein the control system is rendered operative to impose a delay to ensure that the flame is fully extinguished before the reactant supply system provides the flow of the fuel through the burner for auto-ignition in the combustion chamber, and also to monitor the combustion chamber temperature with reference to the auto-ignition temperature during the delay to ensure that the flow of the fuel is provided through the burner before the combustion chamber temperature drops below the auto-ignition temperature.

12. A method as defined in claim 8 wherein the control system is rendered operative to direct the reactant supply system as recited in claim 8 upon determining that the sensed combustion chamber temperature is not below a specified temperature that is predetermined to be above the auto-ignition temperature.

13. A method as defined in claim 12 wherein the control system is rendered operative to direct the reactant supply system to extinguish the flame as recited in claim 8 by applying a gas pulse.

14. A method as defined in claim 8 wherein the control system is rendered operative to direct the reactant supply system to extinguish the flame as recited in claim 8 by providing reactants to the burner in a fuel/oxidant ratio that does not sustain the flame.

15. A method as defined in claim 14 wherein the reactants include recirculated flue gas.

16. An apparatus for use with a furnace structure defining a combustion chamber, a reaction zone having an outlet communicating with the combustion chamber, a burner oriented to fire a flame into the reaction zone in a direction extending into the combustion chamber through the reaction zone outlet, and a reactant supply system operative to provide flows of fuel and oxidant to the reaction zone through the burner for a flame to be fired from the burner, said apparatus comprising:
   a control system which is operative to determine whether or not a combustion chamber temperature is below a predetermined auto-ignition temperature of a fuel, to direct the reactant supply system to extinguish a flame fired from the burner upon determining that the combustion chamber temperature is not below the auto-ignition temperature and subsequently, but before the combustion chamber temperature drops below the auto-ignition temperature, to provide a flow of the fuel through the burner and into the combustion chamber through the reaction zone outlet to initiate diffuse combustion of the fuel by auto-ignition in the combustion chamber in the absence of a flame fired from the burner in the reaction zone.

17. An apparatus as defined in claim 16 wherein said control system is operative to direct the reactant supply system to extinguish the flame as recited in claim 16 automatically without input from an operator of the apparatus.

18. An apparatus as defined in claim 16 wherein said control system is operative to direct the reactant supply system to extinguish the flame as recited in claim 16 only if an operator of the apparatus provides corresponding input instructions.

19. An apparatus as defined in claim 16 wherein the control system is operative to impose a delay to ensure that the flame is fully extinguished before the reactant supply system provides the flow of the fuel through the burner for auto-ignition in the combustion chamber, and also to monitor the combustion chamber temperature with reference to the auto-ignition temperature during the delay to ensure that the flow of the fuel is provided through the burner before the combustion chamber temperature drops below the auto-ignition temperature.

20. An apparatus as defined in claim 16 wherein said control system is operative to direct the reactant supply system to extinguish the flame as recited in claim 16 upon determining that the combustion chamber temperature is not below a specified temperature that is predetermined to be above the auto-ignition temperature.

21. An apparatus as defined in claim 16 wherein said control system is operative to direct the reactant supply system to extinguish the flame as recited in claim 16 by applying a gas pulse.

22. An apparatus as defined in claim 16 wherein said control system is operative to direct the reactant supply system to extinguish the flame as recited in claim 16 by providing reactants to the burner in a fuel/oxidant ratio that does not sustain the flame.

23. An apparatus as defined in claim 22 wherein the reactants include recirculated flue gas.

24. An apparatus comprising:
a furnace structure defining a combustion chamber and a reaction zone having an outlet communicating with said combustion chamber;
a burner oriented to fire a flame into said reaction zone in a direction extending into said combustion chamber through said reaction zone outlet;
a reactant supply system operative to provide flows of fuel and oxidant to said reaction zone through said burner for a flame to be fired from said burner; and
a control system operative to determine whether or not a combustion chamber temperature is below a predetermined auto-ignition temperature of a fuel, to direct said reactant supply system to extinguish a flame fired from said burner upon determining that the combustion chamber temperature is not below the auto-ignition temperature and subsequently, but before the combustion chamber temperature drops below the auto-ignition temperature, to provide a flow of the fuel through said burner and into said combustion chamber through said reaction zone outlet to initiate diffuse combustion of the fuel by auto-ignition in said combustion chamber in the absence of a flame fired from said burner in said reaction zone.

25. An apparatus as defined in claim 24 wherein said control system is operative to direct said reactant supply system as recited in claim 24 automatically without input from an operator of the apparatus.

26. An apparatus as defined in claim 24 wherein said control system is operative to direct said reactant supply system as recited in claim 24 only if an operator of the apparatus provides corresponding input instructions.

27. An apparatus as defined in claim 24 wherein said control system is operative to impose a delay to ensure that the flame is fully extinguished before the reactant supply system provides the flow of the fuel through the burner for auto-ignition in the combustion chamber, and also to monitor the combustion chamber temperature with reference to the auto-ignition temperature during the delay to ensure that the flow of the fuel is provided through the burner before the combustion chamber temperature drops below the auto-ignition temperature.

28. An apparatus as defined in claim 24 wherein said control system is operative to direct said reactant supply system as recited in claim 24 upon determining that the combustion chamber temperature is not below a specified temperature that is predetermined to be above the auto-ignition temperature.

29. An apparatus as defined in claim 24 wherein said control system is operative to direct said reactant supply system to extinguish the flame as recited in claim 24 by applying a gas pulse.

30. An apparatus as defined in claim 24 wherein said control system is operative to direct said reactant supply system to extinguish the flame as recited in claim 24 by providing reactants to said burner in a fuel/oxidant ratio that does not sustain the flame.

31. An apparatus as defined in claim 30 wherein the reactants include recirculated flue gas.

32. An apparatus as defined in claim 24 wherein said reaction zone outlet is constricted relative to the configuration of said reaction zone between said burner and said outlet.

* * * * *

UNITED STATES PATENT AND TRADEMARK OFFICE
CERTIFICATE OF CORRECTION

PATENT NO. : 6,824,383 B2
DATED : November 30, 2004
INVENTOR(S) : Bruce E. Cain

It is certified that error appears in the above-identified patent and that said Letters Patent is hereby corrected as shown below:

<u>Column 4,</u>
Line 20, change "exude" to -- execute --.

Signed and Sealed this

Twenty-seventh Day of December, 2005

JON W. DUDAS
*Director of the United States Patent and Trademark Office*